(12) United States Patent
Lorenzen

(10) Patent No.: US 8,699,970 B2
(45) Date of Patent: Apr. 15, 2014

(54) METHOD AND SYSTEM FOR DETERMINING THE AMPLITUDE AND/OR PHASE OF THE OUTPUT SIGNAL FOR A TRANSMISSION BODY DEPENDING ON THE AMPLITUDE OF THE INPUT SIGNAL

(75) Inventor: Rolf Lorenzen, Unterhaching (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 272 days.

(21) Appl. No.: 13/011,029

(22) Filed: Jan. 21, 2011

(65) Prior Publication Data

US 2011/0124296 A1 May 26, 2011

Related U.S. Application Data

(62) Division of application No. 11/914,379, filed as application No. PCT/EP2006/003394 on Apr. 12, 2006, now Pat. No. 8,019,286.

(30) Foreign Application Priority Data

May 19, 2005 (DE) .......................... 10 2005 023 112
Aug. 10, 2005 (DE) .......................... 10 2005 037 880

(51) Int. Cl.
*H04B 1/04* (2006.01)
(52) U.S. Cl.
USPC ..................................... 455/114.3; 455/127.1
(58) Field of Classification Search
CPC .................................................. H03F 1/3247
USPC ........ 455/114.3, 127.1–127.5, 102, 108, 110, 455/115.1–115.2
See application file for complete search history.

(56) References Cited

U.S. PATENT DOCUMENTS

| 4,110,798 A | 8/1978 | Miller |
| 5,511,129 A | 4/1996 | Craven |
| 6,389,068 B1 * | 5/2002 | Smith et al. ................... 375/225 |
| 6,642,786 B1 * | 11/2003 | Jin et al. ........................ 330/149 |
| 7,016,431 B2 | 3/2006 | Schrader |
| 2002/0168023 A1 | 11/2002 | Schrader |
| 2004/0148121 A1 * | 7/2004 | de Obaldia et al. ........ 455/226.1 |
| 2006/0178120 A1 * | 8/2006 | Puma .......................... 455/114.3 |
| 2006/0246856 A1 * | 11/2006 | Udagawa et al. ............. 455/108 |

FOREIGN PATENT DOCUMENTS

| DE | 19813703 A1 | 2/1999 |
| DE | 19919592 A1 | 11/2000 |
| JP | 2003-518867 A | 6/2003 |
| WO | 9905784 A1 | 2/1999 |
| WO | 03043182 A1 | 5/2003 |
| WO | 2006056344 A1 | 6/2006 |

* cited by examiner

*Primary Examiner* — Lana N Le
(74) *Attorney, Agent, or Firm* — Christensen O'Connor Johnson Kindness PLLC

(57) ABSTRACT

A method and a system for determining the amplitude and/or the phase of the output signal of a transmission link dependent upon the amplitude of the input signal (AM-AM and/or AM-PM characteristic) impresses a test signal (s(t)) on the transmission link, measures the response signal (e(t)) resulting from the test signal (s(t)) by amplitude and/or phase distortion in the transmission link and determines the amplitude response (|e(t)|) of the response signal (e(t)) and/or the phase responses ($\phi_S(t)$, $\phi_E(t)$) of the test signal (s(t)) and of the response signal (e(t)) dependent upon the amplitude response (|s(t)|) of the test signal (s(t)). The amplitude response (|s(t)|) of the test signal (s(t)) consists of several first and second response segments with constant amplitude values over the duration ($\Delta T$) of the respective first or second response segment.

4 Claims, 6 Drawing Sheets

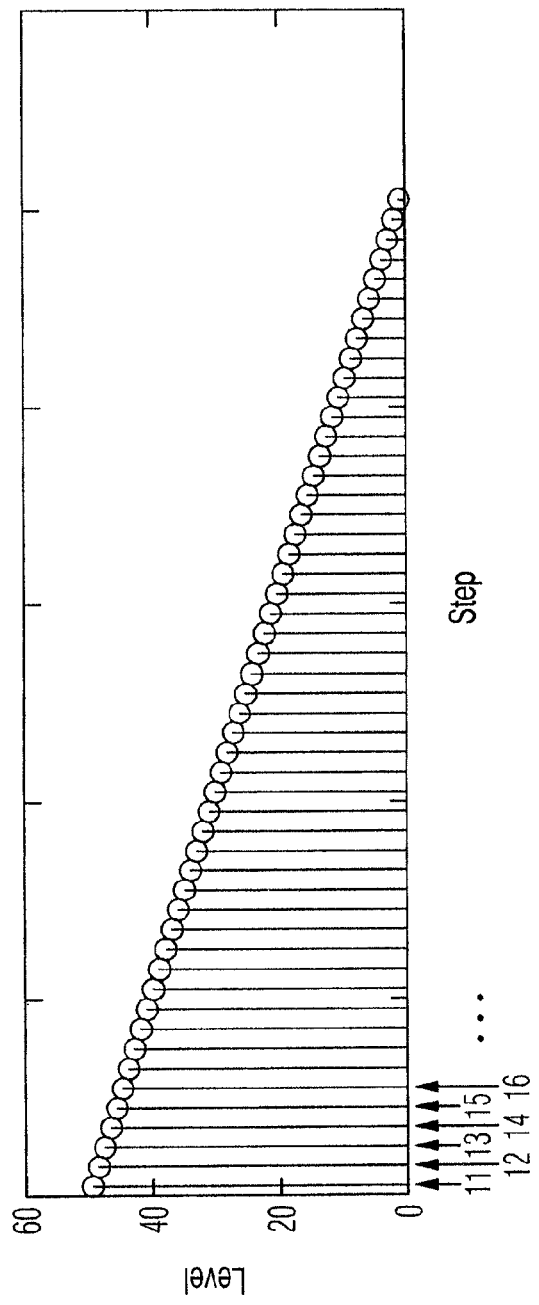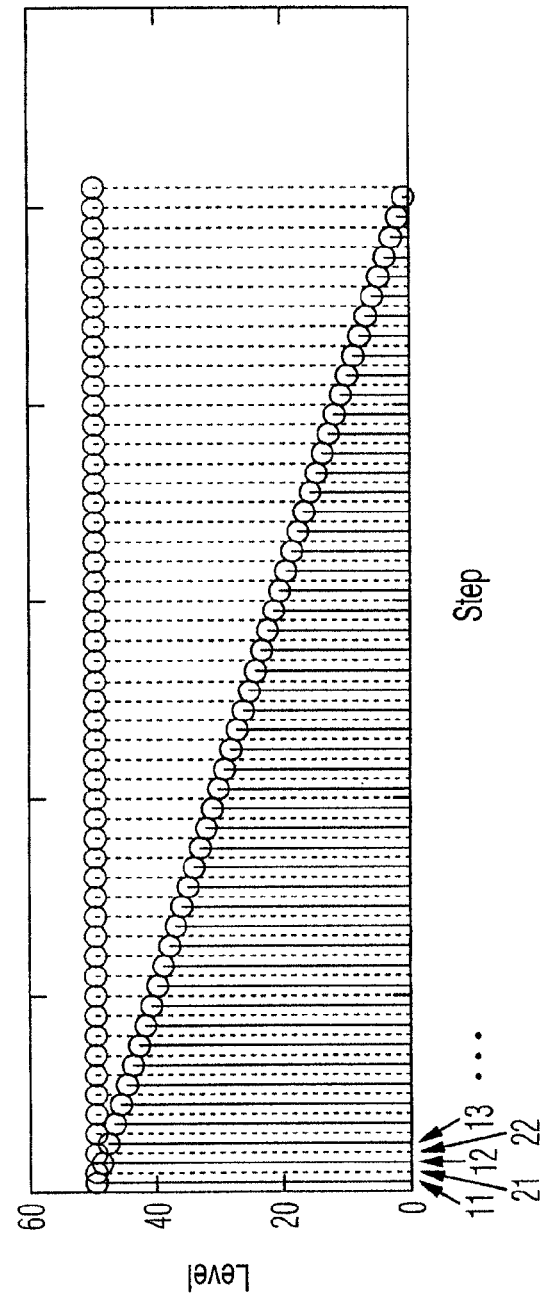
Fig. 6A
Fig. 6B

METHOD AND SYSTEM FOR DETERMINING THE AMPLITUDE AND/OR PHASE OF THE OUTPUT SIGNAL FOR A TRANSMISSION BODY DEPENDING ON THE AMPLITUDE OF THE INPUT SIGNAL

CROSS-REFERENCES TO RELATED APPLICATIONS

This application is a divisional of U.S. application Ser. No. 11/914,379, filed Nov. 13, 2007, which is a 371 National Stage Application of International Application No. PCT/EP2006/003394, filed Apr. 12, 2006, all of which are incorporated by reference herein.

TECHNICAL FIELD

Embodiments of the invention relate to a method and a system for determining the amplitude and/or phase of the output signal of a transmission link dependent upon the amplitude of the input signal (AM-AM and AM-PM characteristic).

BACKGROUND

Communications transmission links, for example, amplifiers in the receiver or transmitter unit of a mobile telephone, provide non-linear transmission behavior. This nonlinear transmission behavior leads to undesirable amplitude and phase distortions of the signal to be amplified. In order to compensate for these undesired distortion effects, it is already known that an equalizing network, of which the characteristic is ideally designed to be inverse to the non-linear transmission characteristic of the transmission link, can be connected in series to the non-linear transmission link.

The amplitude and phase of the output signal of the transmission link dependent upon the amplitude of the input signal (AM-AM and AM-PM characteristic) are therefore required in order to design the characteristic of the equalizing network. A determination of the amplitude characteristic of the transmission link is obtained from the functional context of the amplitude or respectively power of the signal at the output of the transmission link dependent upon the amplitude or respectively power of the corresponding signal at the input of the transmission link within a defined amplitude or respectively power range of the signal at the input of the transmission link. The phase response of the transmission link once again represents the functional context of the phase change of the signal between the output and input of the transmission link dependent upon the amplitude or respectively power of the signal at the input of the transmission link within a defined amplitude or respectively power range of the signal at the input of the transmission link.

WO 99/05784 A1 describes a method and a device for measuring the amplitude and phase distortion of a high-frequency power amplifier. In this context, the signal at the respective input and output of the high-frequency power amplifier is measured via synchronous demodulators. The ratio of the input to the output amplitude or respectively power is determined in order to present the amplitude characteristic, while, the phase value associated with the respective amplitude or respectively power of the signal at the input is determined in order to present the phase characteristic comprising the in-phase and quadrature components of the output signal. The entire characteristic of the amplitude and phase response is determined by specifying a given signal response at the input of the high-frequency power amplifier by means of a signal generator. The synchronization between the signal at the input and output of the high-frequency power amplifier is implemented via a reference carrier signal between the individual synchronous demodulators.

In calibrating power amplifiers in the receiver and/or transmitter units of mobile telephones, the procedure described in WO 99/05784 A1 of measuring two signals, at the input and at the output of the power amplifier, and the additionally-required synchronization of the two signals is excessively costly in terms of time and functions.

SUMMARY

The invention is therefore based upon the object of providing a method and a system for determining the amplitude and/or phase of the output signal of a transmission link dependent upon the amplitude of the input signal, which are optimized with regard to minimal processing time and maximum process security.

The object of the invention is achieved by a system for determining the amplitude and/or phase of the output signal of a transmission link dependent upon the amplitude of the input signal with the features according to claim 1. Advantageous further developments of the invention are specified in the dependent claims.

With the method according to the invention and with the system according to the invention for determining the amplitude and/or phase of the output signal of a transmission link dependent upon the amplitude of the input signal, only the signal at the output of the transmission link is measured according to the invention. The signal, which is impressed at the input of the transmission link and is no longer measured, must therefore be known and, in order to determine the amplitude and phase characteristic of the transmission link correctly, must be synchronized with reference to time, frequency and phase with the signal at the input of the transmission link and must therefore provide no time, frequency and/or phase offsets.

A signal known to the system is achieved at the input of the transmission link, in that the user specifies a known test signal via a unit for super ordinate procedural control to a transmission unit in order to generate the signal at the input of the transmission link.

A time offset between the signal at the input of the transmission link and the response signal at the output of the transmission link resulting from the test signal through amplitude and phase distortion in the transmission link is avoided by using a test signal, which provides a time characteristic with several response segments, each of which provides a constant amplitude response with amplitude values differing from one another, instead of a continuous time characteristic. If a given uncertainty interval is waited for in each of these response segments of the test signal after the adjustment of the respective amplitude value by the signal generator of the test signal, the amplitude value of the response signal can then be measured without the implementation of a time synchronization and compared with the adjusted amplitude value of the test signal in order to achieve a correct AM-AM characteristic, because stationary conditions continue to predominate at the input and output of the transmission link. The phase value of the response signal for determining the AM-PM characteristic can also be measured without the implementation of a time synchronization, because the phase of the response signal can be regarded in a good approximation as constant during one response segment and accordingly, stationary conditions predominate at the input and output of the transmission link in this case also.

However, assuming an absence of phase distortion because of a constant amplitude response of the test signal over several response segments of the test signal, the phase of the response signal can change as a result of a phase drift. This phase drift is compensated in determining the AM-PM characteristic in that the phase of the response signal measured at the output of the transmission link for each amplitude value of the test signal at the input of the transmission link is compared according to the invention with a reference phase. For this purpose, a test signal is generated, which is composed of first response segments with amplitude values changed relative to one another alternating with second response segments with amplitude values un-changed relative to one another. If, according to the invention, the respective difference between the phase value of the response signal measured in a first response segment and the phase value of the response signal measured in the subsequent, second response segment is formed, interfering phase drift is removed from the phase difference obtained in this manner, provided the phase drift is approximately un-changed between a first and a subsequent second response segment. As a result of the un-changed amplitude of the test signal over all second response segments, the amplitude-dependent phase distortions of the response signal are constant in all second response segments and allow a phase referencing, which is de-coupled from the amplitude-dependent phase distortion.

It is disadvantageous that the phase response of the response signal cannot be constant within the individual response segments of the test signal because of a frequency offset in the response signal, but can instead provide a linear, ascending characteristic. In order to compensate for this phase error of the response signal caused by a frequency offset in the response signal, the respectively-occurring frequency offset can be estimated, according to the known methods of the prior art, in each individual response segment of the test signal. From the frequency offset estimated for each response segment of the test signal, an average frequency offset is calculated via an average formation for the entire phase response of the response signal by additionally weighting the individual frequency offsets with the associated amplitude values of the test signal. This weighting of the individual frequency offsets with the associated amplitude values of the test signal takes into consideration the more precise estimation of the frequency offset in response segments with higher amplitude values of the test signal because of an improved signal-noise interval predominating there.

DESCRIPTION OF THE DRAWINGS

An exemplary embodiment of the method according to the invention for measuring the amplitude and phase response of a transmission link and of the system according to the invention for measuring the amplitude and phase response of a transmission link is explained in greater detail below with reference to the drawings.

The drawings are as follows:

FIG. 6A, 6B shows a time-flow diagram of the amplitude values of the test signal for determining the AM-AM and the AM-PM characteristic of transmission link.

DETAILED DESCRIPTION

Figure 1:
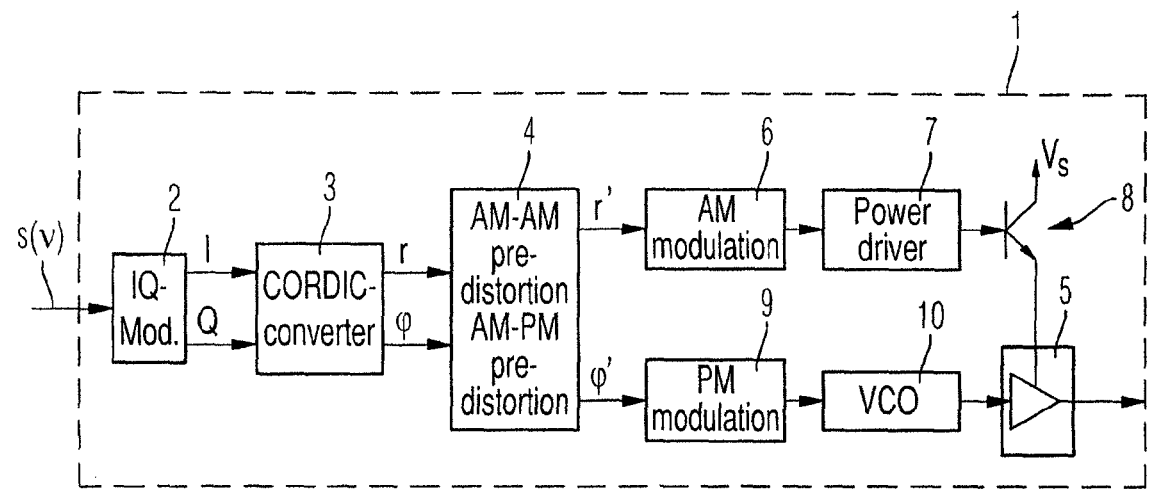
FIG. 1 shows a block circuit diagram of a polar modulator to be calibrated for a mobile telephone.
Figure 2:
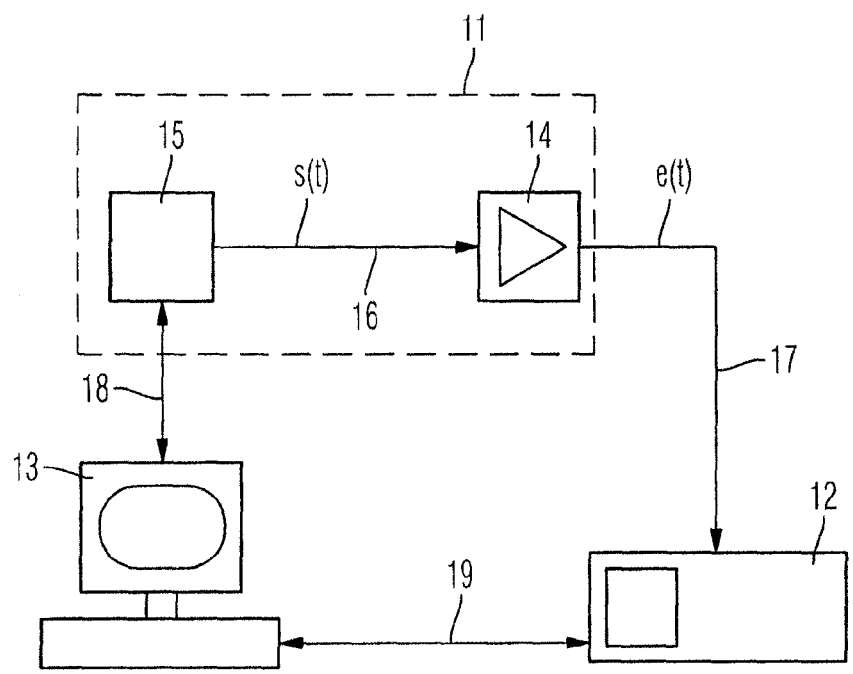
FIG. 2 shows a block circuit diagram of a system according to the invention for measuring the AM-AM and the AM-PM characteristic of transmission link.
Figure 4:
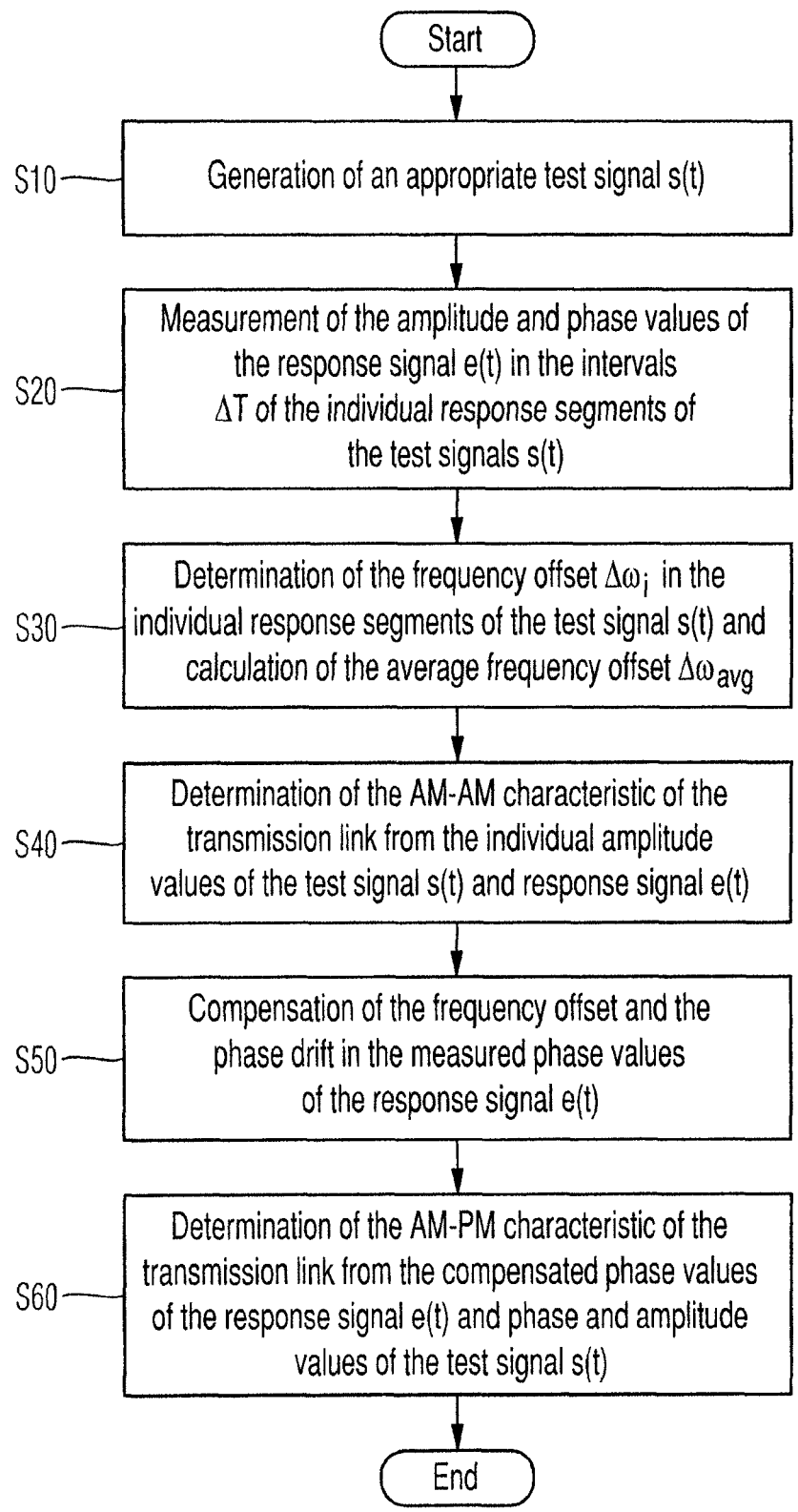
FIG. 4 shows a flow chart for a method according to the invention for measuring the AM-AM and the AM-PM characteristic of a transmission link.

Before describing a system according to the invention and a method according to the invention for determining the amplitude and phase response of a general transmission link with reference to FIG. 2 and FIG. 4, the structure and respective functioning of a polar modulator for a mobile telephone will first be presented with reference to FIG. 1, of which the calibration can be regarded as a preferred application of the method according to the invention and the system according to the invention for measuring the amplitude and phase characteristic of a transmission link.

The polar modulator 1 is supplied from a signal source, which is not shown in FIG. 1, with a symbol sequence s(n) to be transmitted. With the assistance of a carrier signal, an IQ modulator 2 generates from the signal sequences s(v) the in-phase and quadrature components I and Q of a quadrature signal to be transmitted by the mobile telephone. The in-phase and quadrature components I and Q of the quadrature signal are converted via a CORDIC converter 3 into corresponding amplitude and phase components r and φ (polar coordinates) of the signal to be transmitted.

A separate pre-distortion of the amplitude component r and the phase component φ takes place in a subsequent pre-distortion unit 4. As a result of the pre-distortion, an amplitude and phase distortion of the signal to be transmitted caused in the subsequent power amplifier 5 is compensated, and a signal to be transmitted is generated accordingly in the polar modulator 1, which ideally provides no amplitude and phase distortion.

In an amplitude modulator 6, the pre-distorted amplitude component r' is then converted substantially via a multiplying digital-analog converter into the level range required to control a subsequent power driver 7. The power driver 7 controls a power transistor 8, which is supplied from a voltage source $V_s$ and serves as an external power output stage of the power amplifier 5.

In parallel with the amplitude modulation path, the pre-distorted phase component φ' is supplied to a phase modulator 9 in a phase modulation path. The phase modulator 9 generates from the phase component φ' a signal, which corresponds to the frequency of the time-rotating phase component φ' and serves as a set frequency value for a subsequent voltage-controlled frequency oscillator (VCO) 10. The frequency signal generated by the voltage-controlled frequency oscillator 10 is supplied to the power amplifier 5 and amplified with regard to its amplitude in the power transistor 8 serving as the power end-stage and transferred at the output of the power amplifier 5 to the antenna of the mobile telephone.

For the pre-distortion in the pre-distortion unit 4 of the amplitude component r and phase component φ of the signal to be transmitted, the amplitude pre-distortion characteristic (AM-AM pre-distortion characteristic) and the phase-pre-distortion characteristic (AM-PM pre-distortion characteristic) must be determined. In an ideal pre-distortion, this is inverse to the respective amplitude-distortion characteristic (AM-AM distortion characteristic) and phase distortion characteristic (AM-PM distortion characteristic) of the power amplifier 5. Accordingly, for a distortion-free operation of the polar modulator 1 of the mobile telephone, the determination of the amplitude and phase response of the power amplifier 5 must be investigated within the framework of a calibration procedure of the mobile telephone.

The description below presents a system according to the invention for determining the amplitude and phase response of a general transmission link as shown in FIG. 2 starting from a power amplifier 5 of a polar modulator 1 for a mobile telephone as shown in FIG. 1.

The system according to the invention consists of a device under test (DUT) to be calibrated 11, which corresponds to the polar modulator 1 of the mobile telephone in FIG. 1; a measuring device 12; and a unit for super ordinate procedural control 30, which is realized, for example, by a personal computer. The device under test 11 to be calibrated once again consists of a transmission link 14, which corresponds to the power amplifier 5 of the polar modulator 1 illustrated in FIG. 1, with a generally non-linear amplitude and phase characteristic.

The transmission link 14 is supplied from the transmission unit 15, which corresponds as a whole to the functional units 2, 3, 4, 6, 7, 8, 9 and 10 of the polar modulator 1 shown in FIG. 1, via the uni-directional connection line 16, with a test signal s(t), which consists of an amplitude component |s(t)| and a phase component $\phi_s(t)$, and delivers a response signal e(t) distorted corresponding to its amplitude and phase characteristic, which consists of an amplitude component |e(t)| and a phase component $\phi_E(t)$, via the uni-directional connecting line 17, to the device under test 12. The unit for super ordinate procedural control 13 communicates via the bi-directional connecting line 18 with the transmission unit 15 and via the bi-directional connecting line 19 with the measuring device 12.

Figure 3:
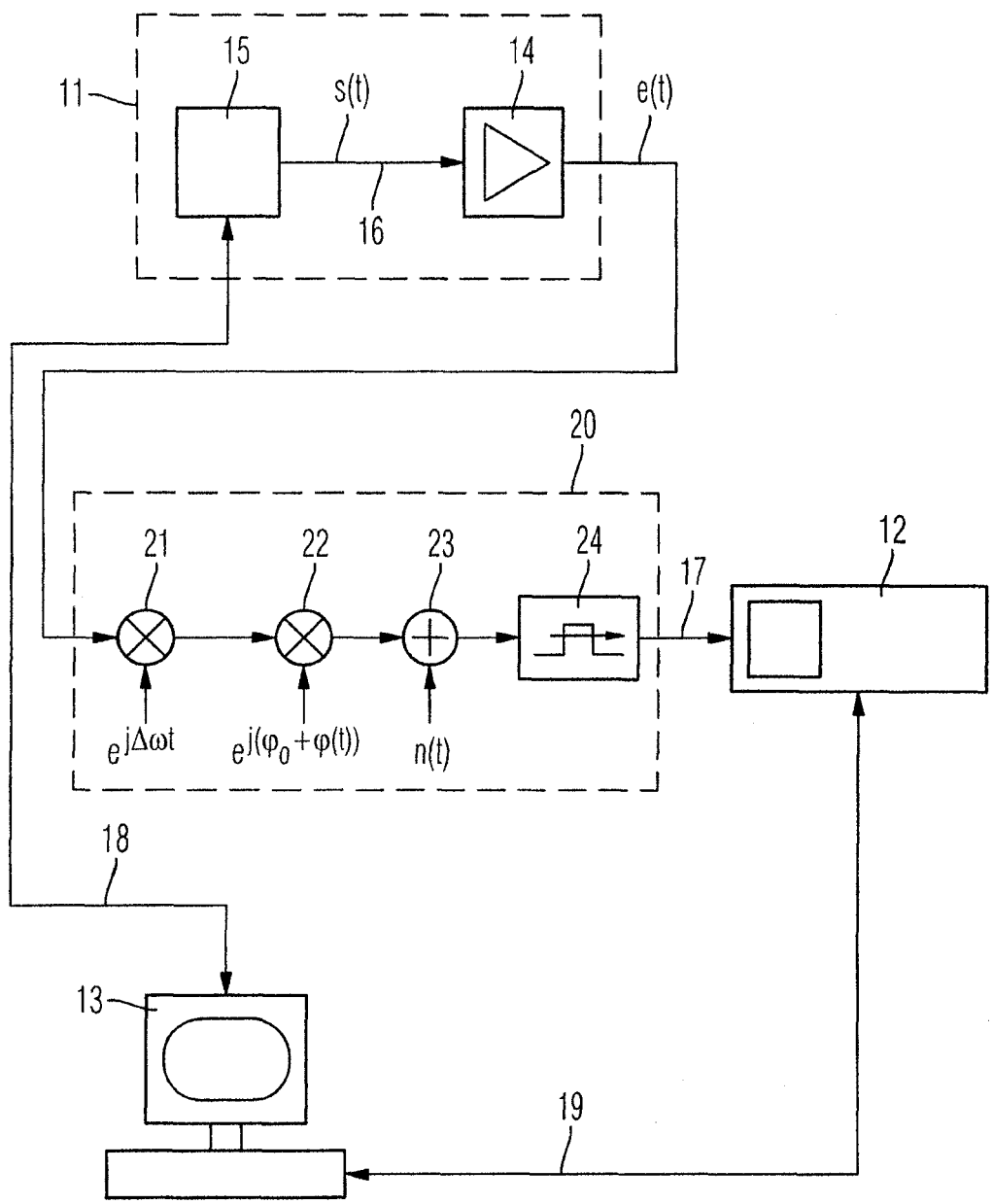
FIG. 3 shows an error model for synchronisation errors in the calibration of a polar modulator for a mobile telephone.

FIG. 3 presents an error model 20, which, with the exception of the AM-AM distortions and AM-PM distortions, contains all of the errors to be taken into consideration for the calibration of the transmission link 14, connected in series to the calibrating transmission link 14 of the system according to the invention for determining the amplitude and phase characteristic of a general transmission link 14.

Via the multiplication element 21, a term $e^{-j\Delta\omega t}$, which models a frequency offset $\Delta\omega$ on the basis of an absence of frequency synchronization in the calibration, is superimposed over the response signal e(t) in the error model 20. In the subsequent multiplication element 22 of the error model 20, a term $e^{-j(\Phi_0+\phi(t))}$, which models a start phase $\phi_0$ and a phase drift $\phi$ on the basis of an absence of phase synchronization in the calibration, is superimposed over the response signal e(t). The subsequent adding unit 23 of the error model 20 superimposes a noise signal n(t) over the response signal e(t). Finally, in the concluding time-delay element 24 of the error model 20, a time delay between the transmission signal s(t) and the response signal e(t) is modeled on the basis of an absence of time synchronization in the calibration.

In the description below, the method according to the invention for measuring the AM-AM and the AM-PM characteristic of a transmission link 14 is described with reference to FIG. 4. In this context, particular reference is made to the time, frequency and phase synchronization required for the correct measurement of the AM-AM and the AM-PM characteristic of the transmission link.

Figure 5:
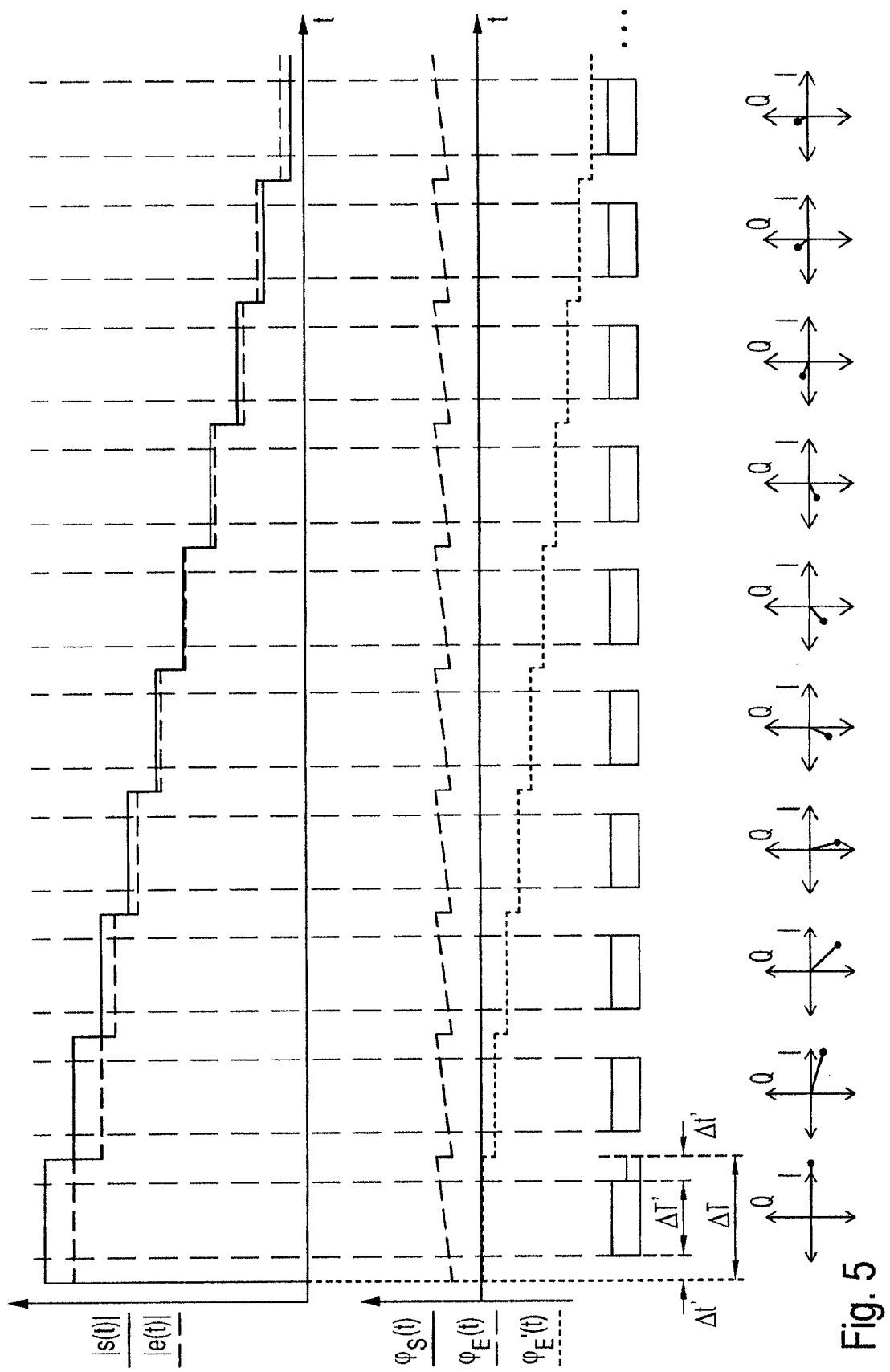
FIG. 5 shows a time-flow diagram of the amplitude and phase response of the test signal and of the response signal.

In procedural stage S10 of the method according to the invention for measuring the AM-AM and the AM-PM characteristic of a transmission link 14, a transmission signal s(t) is generated by the transmission unit 15. As shown in FIG. 5 in the upper time-flow diagram, this transmission signal s(t) provides, an amplitude response |s(t)|, which is characterized by intrinsically-constant response segments, such as the "descending stair function" shown in FIG. 5. The lower time-flow diagram of FIG. 5 shows the phase response $\phi_s(t)$ of the transmission signal s(t), which, according to the invention, provides a constant and identical value over all response segments of the transmission signal s(t), shown as a continuous line in FIG. 5 with the exemplary value zero.

According to embodiments of the invention, the amplitude response |s(t)| of the transmission signal s(t) according to FIG. 6A provides first response segments 1i of the length $\Delta T$ with amplitude values $|s_{1i}|$ changed relative to one another. The AM-AM characteristic of the transmission link 14 can be determined with a transmission signal s(t), which provides an amplitude response |s(t)| as shown in FIG. 6A, because of the amplitude values $|s_{1i}|$ changed relative to one another. An amplitude response |s(t)| of the transmission signal s(t) according to FIG. 6B is used to determine the AM-PM characteristic of the transmission link 14 according to the invention. This also consists of intrinsically-constant response segments $\Delta T$, but contains first response segments 1i with amplitude values $|s_{1i}|$ changed relative to one another—shown as a continuous line in FIG. 6B—in alternation with second response segments 2i with amplitude values $|s_{2i}|$ unchanged relative to one another—broken line in FIG. 6B. In order to guarantee first and second response segments with respectively-constant amplitude values $|s_{1i}|$ and $|s_{2i}|$ allowing a correct measurement of the AM-AM and AM-PM characteristic, a given uncertainty interval $\Delta t'$ is waited for at the beginning of each first and second response segment 1i or respectively 2i, until stationary conditions predominate at the input of the transmission link 14 in the following interval $\Delta T'$ after a transient initial response of the transmission unit 15.

In the following procedural stage S20, during the intervals $\Delta T'$ of the first and second response segments 1i and 2i of the transmission signal s(t), the respective amplitude values $|e_{1i}|$ and $|e_{2i}|$ and phase values $\phi_{E1i}$ and $\phi_{E2i}$ of the response signal e(t) are measured. As shown in FIG. 5, the amplitude response |e(t)| of the response signal e(t) in the first and second response segments 1i and 2i of the transmission signal s(t)—shown as a broken line in the upper time-flow diagram of FIG. 5—provides constant response segments with the associated amplitude values $|e_{1i}|$ and $|e_{2i}|$ at least within the range of the intervals $\Delta T'$.

In the case of a superimposed frequency offset $\Delta\omega$, in the first and second response segments 1i and 2i of the transmission signal s(t), the phase response $\omega_E(t)$ of the response signal e(t) in the lower time-flow diagram of FIG. 5 provides in each case a linear ascending phase response—broken line in the lower time-flow diagram of FIG. 5; with a compensation of the superimposed frequency offset $\Delta\omega$, the phase response $\phi_E(t)$ of the response signal e(t) in the first and second response segments 1i and 2i of the transmission signal s(t) provides in each case a constant phase response—dotted line in the lower time-flow diagram of FIG. 5. The unsteadiness in the phase response $\phi_E(t)$ of the response signal e(t) at the transitions between the first and second response segments 1i and 2i of the transmission signal s(t) result from the amplitude-value change of the transmission signal at the transitions and the dependence of the phase $\phi_E(t)$ of the response signal e(t) upon the amplitude |s(t)| of the transmission signal s(t) corresponding to the AM-PM characteristic of the transmission link 14.

Procedural stage S30 comprises the estimation of the frequency offset $\Delta\omega_i$ in the individual first and second response segments $1i$ and $2i$ of the response signal e(t) according to the method of the prior art, to which further reference need not be made in the present description. Since the estimation of the individual frequency offsets $\Delta\omega_{1i}$ and respectively $\Delta\omega_{2i}$ is provided respectively with a statistical estimation error, an averaged frequency offset $\Delta\omega_{avg}$, which is used for all of the first and second response segments $1i$ and $2i$ of the response signal e(t) in the description below, is calculated in order to compensate the frequency offset, $\Delta\omega$ in the phase response $\omega_E(t)$ of all of the estimated frequency offsets $\Delta\omega_{1i}$ and respectively $\Delta\omega_{2i}$. For this purpose, each estimated frequency offset $\Delta\omega_{1i}$ and respectively $\Delta\omega_{2i}$ is weighted according to equation (1), in one of the first and second response segments $1i$ and $2i$ of the response signal e(t) with the associated amplitude value $|e_{1i}|$ or $|e_{2i}|$ of the response signal e(t).

$$\Delta\omega_{avg} = \frac{1}{\sum_{i=1}^{N}(|e_{1i}|+|e_{2i}|)} \cdot \sum_{i=1}^{N}(\Delta\omega_{1i}\cdot|e_{1i}|+\Delta\omega_{2i}\cdot|e_{2i}|) \quad (1)$$

In the next procedural stage S40, the AM-AM characteristic of the transmission link 14 is determined for each of the first and second response segments $1i$ and $2i$ of the transmission signal s(t) from the ratio of the amplitude values $|s_{1i}|$ and respectively $|s_{2i}|$ of the transmission signal s(t) to the amplitude values $|e_{1i}|$ and respectively $|e_{2i}|$ of the response signal e(t).

In procedural stage S50, a compensation of a frequency offset $\Delta\omega_{1i}$ or $\Delta\omega_{2i}$ present in the respective individual first and second response segments $1i$ and $2i$ of the measured phase response $\omega_E(t)$ of the response signal e(t) is implemented by compensating the entire phase response $\omega_E(t)$ of the response signal e(t) with the average frequency offset $\Delta\omega_{avg}$ determined in procedural stage S40 (transfer from the broken line into the dotted line in FIG. 5). The phase values $\omega_{E1i}'$ and $\omega_{E2i}'$ of the response signal e(t) accordingly determined in the first and second response segments $1i$ and $2i$ and therefore additionally frequency-offset-compensated are adjusted with regard to any occurring phase drift $\omega_i$ in procedural stage S50. For this purpose, a phase referencing by forming a phase difference $\omega_{Ei}''$ between the frequency-offset-compensated phase value $\omega_{E1i}'$ of the response signal e(t) in a first response segment $1i$ of the transmission signal s(t) and the frequency-offset-compensated phase value $\omega_{E2i}'$ of the response signal e(t) in the subsequent second response segment $2i$ of the transmission signal s(t) is calculated according to equation (2).

Since a phase drift $\omega(t)$ possibly occurring in the phase response $\omega_E(t)$ of the response signal e(t), is approximately unchanged between each of the two adjacent first and second response segments $1i$ and $2i$ of the transmission signal s(t), a phase drift $\omega_i$ is removed from the phase differences $\omega_{Ei}''$ calculated respectively between two adjacent first and second response segments $1i$ and $2i$.

$$\phi_{Ei}'' = \phi_{E2i}' - \phi_{E1i}' \quad (2)$$

Figure 7A:
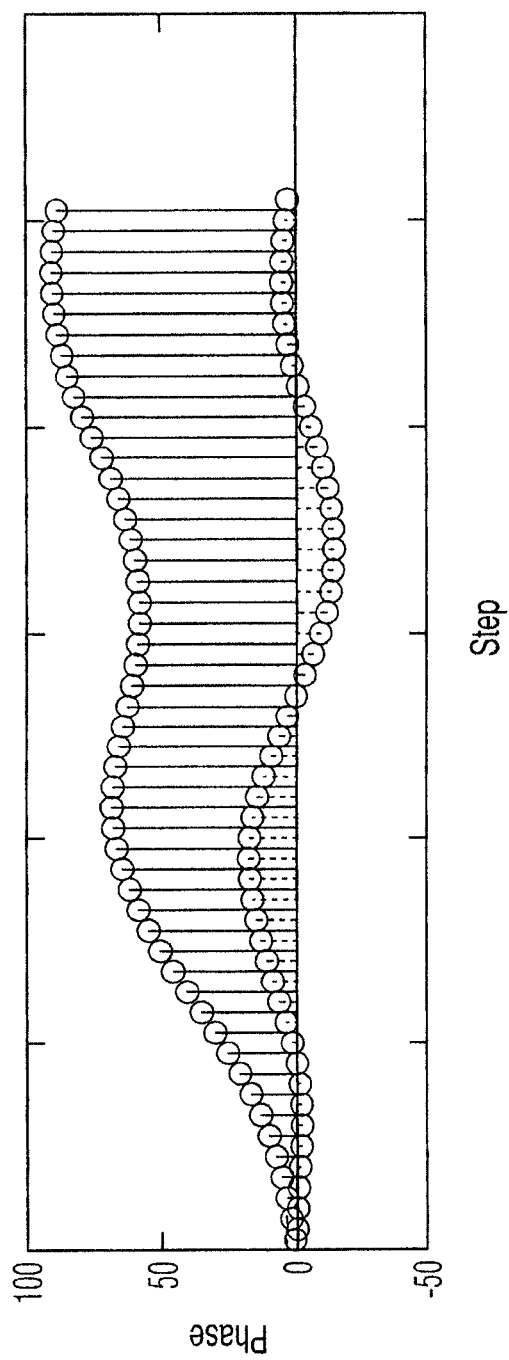
FIG. 7A, 7B shows a time-flow diagram of the phase values of the response signal with a phase error on the basis of the superimposition of AM-PM distortion and phase drift, with a phase error resulting from a phase drift and with a phase error resulting from AM-PM distortion.
Figure 7B:
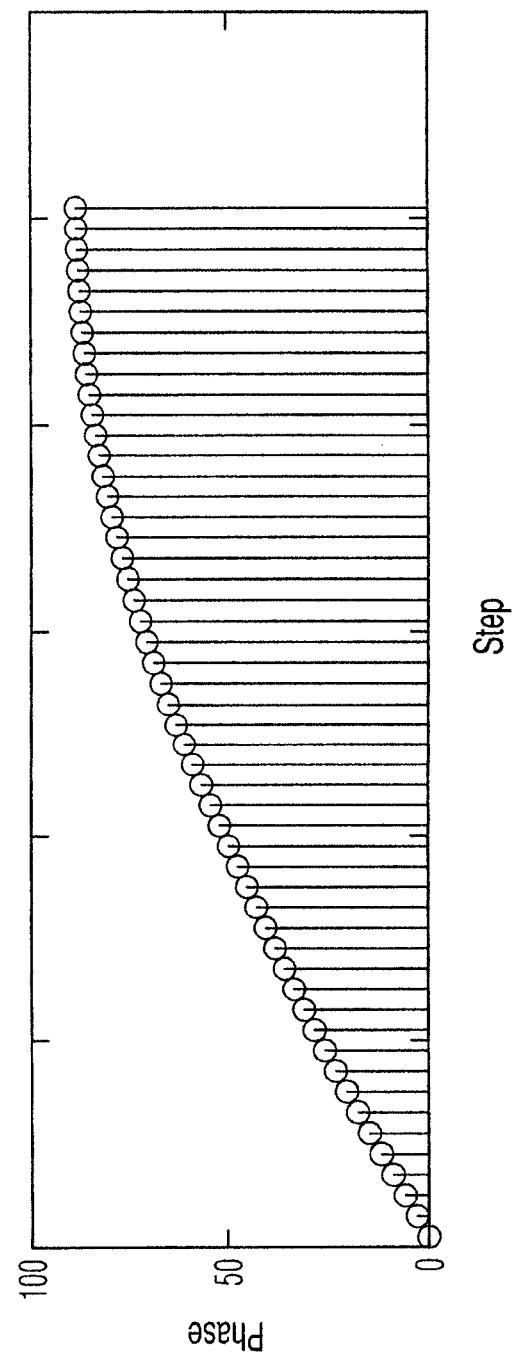

FIG. 7A shows the response of the measured frequency-offset-compensated phase values $\omega_{E1i}'$ and $\omega_{E2i}'$ of the response signal e(t)—continuous line in FIG. 7A, which results from a phase distortion because of the AM-PM characteristic and the phase drift $\omega_i$, and the response of the individual phase drifts $\omega_i$—broken lines in FIG. 7A. If a phase drift $\omega_i$ is removed from the measured frequency-offset-compensated phase values $\omega_{E1i}'$ and $\omega_{E2i}'$ of the response signal e(t) according to equation (2), the response of the frequency-offset and phase-drift compensated phase values $\omega_{Ei}''$, which result exclusively from the phase distortion of the AM-PM characteristic of the transmission link 14, are obtained as presented in FIG. 7B.

In the final procedural stage S60, the AM-PM characteristic of the transmission link 14 is determined by forming the difference between the frequency-offset-compensated and phase-drift-compensated phase values $\omega_{Ei}''$ and the phase values $\omega_{s1i}$ or $\omega_{s2i}$ in the first or second response segment $1i$ or $2i$ of the transmission signal s(t) and subsequent division by the respective amplitude value $|s_{1i}|$ of the test signal s(t) in the first response segment $1i$.

The method presented in FIG. 4 is based upon a presentation and calculation in polar coordinates (absolute value and phase). Alternatively, the method, especially the measurement of the response signal e(t)—procedural stage S20 in FIG. 4—and the compensation of the frequency offset $\Delta\omega$—procedural stage S50 in FIG. 4—, can also be implemented in Cartesian coordinates (in-phase and quadrature component), wherein a transformation of IQ coordinates into polar coordinates is required following the determination of the AM-AM and the AM-PM characteristic. In this manner, the sequence of the individual procedural stages in FIG. 4 is altered, and an additional procedural stage of a coordinate transformation is implemented.

The invention is not restricted to the embodiment presented. In particular, the measurement of other communications transmission links, for example, filters, mixers etc. and other transmission signals according to different modulation methods and standards, is covered by the invention, as claimed.

The embodiments of the invention in which an exclusive property or privilege is claimed are defined as follows:

1. System for determining the amplitude and/or the phase of the output signal of a transmission link dependent upon the amplitude of the input signal, which provides a series circuit with a transmission unit, a transmission link, which is provided with a test signal generated by the transmission unit, and a measuring device configured to measure exclusively a response signal resulting from the test signal by amplitude and/or phase distortion in the transmission link, wherein the amplitude of the test signal includes several first and second response segments over the duration of the respective first or second response segments, wherein the first response segments have amplitude values changed relative to one another and the second response segments have amplitude values unchanged relative to another, wherein the successive first response segments of the test signal have diminishing amplitude values, and wherein the amplitude values of the second response segments of the test signal correspond to the largest amplitude value of the first response segments of the test signal.

2. System according to claim 1, wherein
the system also contains a unit for super ordinate procedural control, which is connected to the transmission unit and to the measuring device and determines the AM-AM and/or AM-PM characteristic of the transmission link from the phase and/or amplitude response of the test signal and the response signal.

3. System according to claim 2, wherein
the transmission link is a power amplifier, which is integrated within a polar modulator.

4. System according to claim 1, wherein
the transmission link is a power amplifier, which is integrated within a polar modulator.

\* \* \* \* \*